United States Patent Office 3,332,520
Patented July 25, 1967

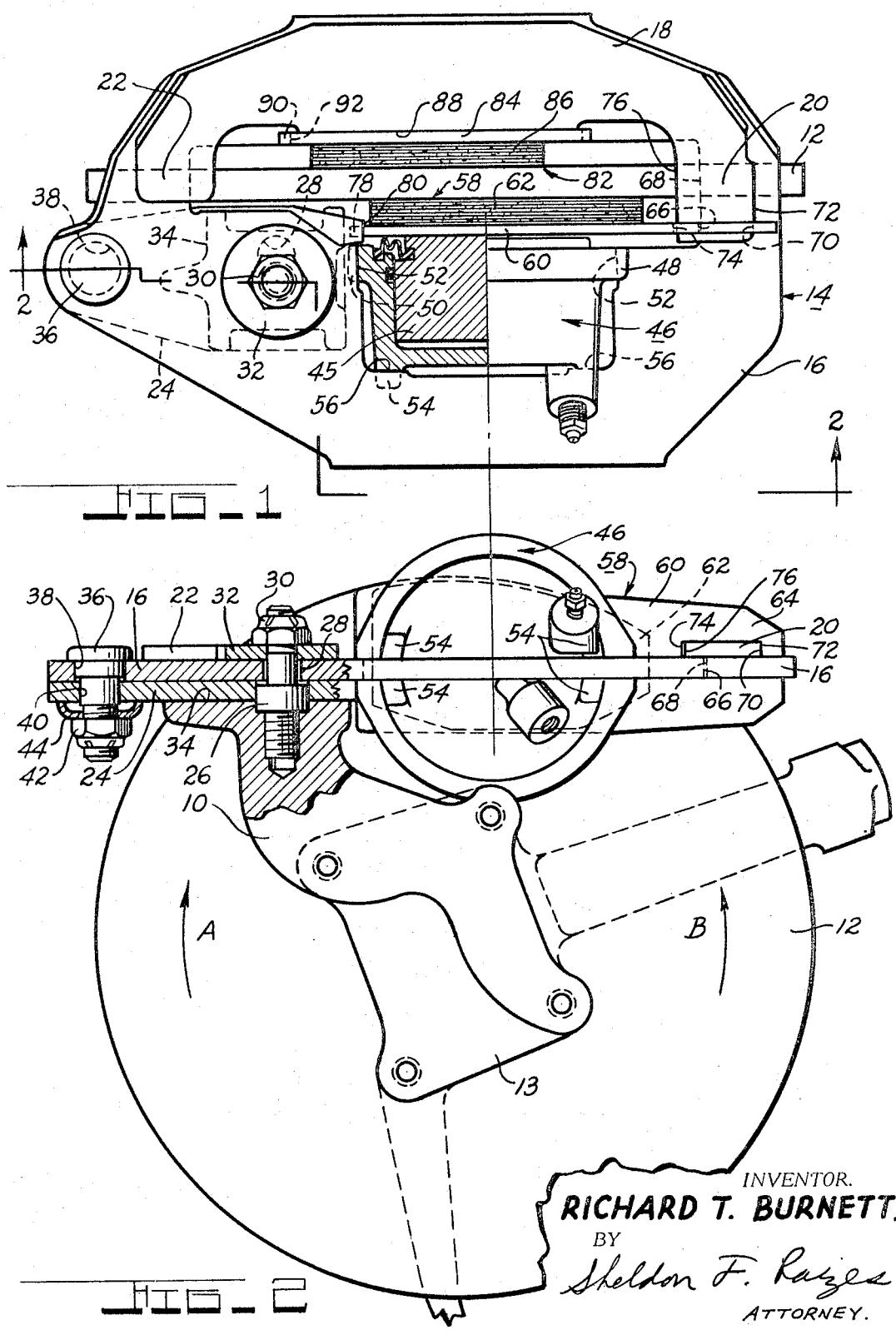

3,332,520
DISC BRAKE
Richard T. Burnett, South Bend, Ind., assignor to The Bendix Corporation, South Bend, Ind., a corporation of Delaware
Filed Aug. 11, 1965, Ser. No. 478,956
7 Claims. (Cl. 188—73)

This invention relates to a disc brake.

More particularly, this invention relates to a floating caliper disc brake.

An object of the invention is to provide a disc brake wherein the floating caliper is pivotally mounted to a support member in such a manner that the caliper slides lineally towards and away from the disc.

Another object of the invention is to pivotally mount a caliper extending generally chordally of the disc to the support plate by a link which extends in the same chordal direction as the caliper wherein the caliper will shift in a lineal direction towards and away from the disc and maintain the brake shoes on opposite sides of the disc in parallel relationship with the disc throughout wear of the shoes.

Other objects will become apparent from the following description with reference to the drawings wherein:

FIGURE 1 is a plan view of a brake assembly; and
FIGURE 2 is a front view of the brake assembly of FIGURE 1.

Referring to FIGURES 1 and 2, a support bracket 10 extends along one side of a disc 12 and is secured to a stationary part of a vehicle such as a spindle 13. A cage 14 comprises a closed loop stamping 16, which embraces the disc 12, and a reinforcing stamping 18 fixedly secured to and lying on top of stamping 16. The stamping 18 is opposite one side of the disc 12 and has circumferentially spaced ends 20 and 22 extending across the periphery of the disc 12. A link 24 is pivoted on an anchor pin 26 which is threadedly secured to the support bracket 10. The anchor pin 26 extends through an oversized slot 28 in the stamping 16 and a nut 30 and washer 32 presses the link 24 into sliding engagement with the surface 34 on the support bracket 10. A stud 36 is press-fitted into an opening 38 in the stamping 16 and extends through an opening 40 in the link 24. A nut 42 is secured to the stud 36 and presses a cup-shaped washer 44 against the link 24 to pivotally secure the cage 14 to the link 24. The edge of the opening 28 does not engage the anchor pin 26 at any time and the whole anchoring load exerted on the cage 14 will be transferred to the anchoring pin 26 by the link 24.

A wheel cylinder housing 46 has an actuating piston 45 slidably mounted therein and includes a pair of ears 48 on diametrically opposite sides thereof each of which has a slot 50 for receiving an edge 52 of a recess in the stamping 16. Two sets of projections 54, located on the closed end of the housing 46 embrace the stamping 16 at the closed end 56 of the recess and act in conjunction with the ears 48 to support the cylinder housing on the cage 14.

A brake shoe 58, comprising a backing plate 60 and friction lining 62 secured thereto, is located between the cylinder 46 and the disc 12 and has a slotted end portion 64 slidably embracing the stamping 16 and end 20 of the stamping 18. The edge 66 on the backing plate 60 slidably engages the edge 68 of the stamping 16. The edge 70 on the backing plate engages the edge 72 on the stamping 18. A clearance is provided between the edge 74 on the backing plate and edge 76 on the stamping 18.

The other end of the shoe has a slot 78 in the backing plate 60 slidably receiving therein an edge 80 located on the link 24. The edge 80 and slot 78 cooperate only to guide the shoe, there being no anchoring at that spot.

A shoe 82, comprising a backing plate 84 and friction lining 86 secured thereto, is located between the chordal edge 84 of stampings 16 and 18 and the disc 12. The backing plate 84 has a pair of circumferentially spaced slots 90 each receiving therein an edge 92 on the stamping 16 to form a tab and slot connection therebetween.

In operation, assuming rotation of the disc in the direction of Arrow A, the piston 45 will thrust the shoe 58 into engagement with the disc 12. The load exerted by the disc 12 on the shoe 58 will be transferred through the anchoring edges 66, 68 into the cage 14, through the stud 36 into the link 24 and into the anchoring pin 26. The load exerted by the disc 12 on the shoe 82 will be transferred by the cage to the link 24 through the stud 36 and then to the anchor pin 26.

The brake operation will be the same upon braking when the disc 12 is rotating in the direction of Arrow B, only the load exerted by the disc 12 on the shoe 58 will be transferred to the cage by anchoring edges 70, 72. As the linings 62 and 86 wear, the link 24 will pivot on anchor pin 26 to compensate therefor and effect linear movement of the cage 14 and maintain the parallel relationship of the brake shoes 58 and 82 with the disc 12.

While the invention has been described in considerable detail, it is my intention to include all equivalent modifications within the scope of the following claims.

I claim:

1. A disc brake comprising:
   a rotor having a pair of opposed annular braking surfaces thereon;
   a stationary support member opposite one side of said rotor;
   a closed looped housing, said housing including a first portion extending opposite of and generally chordally of one side of said rotor, a second portion extending opposite of and generally chordally of the other side of said rotor, and means extending across the periphery of said rotor interconnecting said first and second portions;
   actuating means carried by said closed looped housing;
   a link mounted to said housing at one end about an axis which is generally perpendicular to the general chordal plane of said closed looped housing, said link extending opposite said one side of said rotor in the same general chordal direction as said first portion of said closed loop housing;
   a pivot connection securing the other end of said link to said support member for pivotal movement about an axis which is generally parallel to the axis of the mounting securing said link to said closed loop housing whereby said housing is reciprocably movable in a direction which is generally perpendicular to the plane of said braking surfaces;
   a first friction member operatively connected to said closed loop housing and said actuating means to be slidably guided by the means extending across the periphery of said rotor when moved into contact with one of said braking surfaces by said actuating means whereby the load exerted by the contact of said first friction member with one of said braking surfaces is transmitted to said closed looped housing and via said link to said support member;
   a second friction member secured to said housing for movement therewith into engagement with the other of said braking surfaces of said rotor upon reciprocable movement of said housing as caused by said actuating means when it is moving said first friction member into contact with said one of said braking surfaces.

2. A disc brake comprising:
   a rotor having a pair of opposed annular braking surfaces thereon;

a stationary support member opposite one side of said rotor;

an anchor member secured to said support member and extending in a direction which is generally parallel to the plane of said rotor;

a closed looped housing, said housing including a first portion extending opposite of and generally chordally of one of said braking surfaces, a second portion extending opposite of and generally chordally of the other of said braking surfaces, and circumferentially spaced portions extending transversely across the periphery of said rotor interconnecting said first and second portions;

a link extending opposite said one braking surface in the same general chordal direction as said first and second portions of said housing, said link being pivotally secured at one end to said anchor member, the other end of said link being located adjacent the peripheral edge of said rotor;

means mounting said housing on said other end of said link about an axis which is generally parallel to the axis about which said link pivots that is normally perpendicular to the general chordal plane in which said first and second portions of said housing extend, whereby the whole housing is linearly movable in a direction which is generally perpendicular to the plane of said braking surfaces;

a first friction member slidably carried by said closed looped housing and engageable with one of said braking surfaces;

a second friction member secured to said housing for movement therewith into engagement with the other of said friction surfaces;

actuating means carried by said housing, said actuating means comprising a fluid cylinder carried by said first portion and a reciprocable piston therein engaging said first friction member for exerting an applying thrust thereon.

3. In a disc brake:

a rotor having a pair of opposed annular braking surfaces thereon;

a stationary support member opposite one side of said rotor;

a link extending opposite of and generally chordally of said one side of said rotor, said link having one end overlying said support member;

a closed loop housing attached to the other end of said link, said housing mounting first and second friction means having offset friction linings on opposite sides of said rotor for engagement with said braking surfaces thereof;

a means pivotally connecting said one end of said link to said support member, which means includes a lost motion connection with said closed loop housing inwardly of the attachment of said housing to the other end of said link; and an actuator means carried by said housing which when operated not only engages one of said friction means with its respective braking surface but reciprocates said closed loop housing linearly to thrust the other friction member on its respective braking surface.

4. The structure as recited in claim 1 wherein said one end of said link is located chordally between the path of the applying thrust exerted on said first friction member by said actuating means and said other end of said link.

5. A disc brake according to claim 1 wherein said first and second friction member include backing plates and friction linings secured thereto with said friction linings on opposite sides of said rotor arranged to engage the respective braking surfaces of said rotor at points offset from each other whereby upon wear of said friction linings said friction members will be maintained in a parallel relationship.

6. A disc brake according to claim 5 wherein said backing plate of said friction lining of said first friction member is slotted to be slidable along the upper and lower surfaces of said closed looped housing and formed with an abutment surface for engaging an inside edge of said means extending across the periphery of said rotor whereby the loading of said friction member is transferred to said closed looped housing.

7. The structure as recited in claim 2 wherein said anchor member is located chordally between said fluid cylinder and said other end of said link.

References Cited

UNITED STATES PATENTS 3,199,632    8/1965    Chouings _____ 188—73

FOREIGN PATENTS 1,002,208    2/1957    Germany.

MILTON BUCHLER, *Primary Examiner.*

G. E. HALVOSA, *Assistant Examiner.*